(12) United States Patent
Endo

(10) Patent No.: US 7,717,345 B2
(45) Date of Patent: May 18, 2010

(54) MEDIA PROCESSING DEVICE

(75) Inventor: Katsuyuki Endo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/072,306

(22) Filed: Feb. 26, 2008

(65) Prior Publication Data

US 2008/0203169 A1 Aug. 28, 2008

(30) Foreign Application Priority Data

Feb. 27, 2007 (JP) ............................. 2007-046596

(51) Int. Cl.
*G06K 13/00* (2006.01)
(52) U.S. Cl. ........................ 235/475; 235/379; 235/449; 235/454; 382/137
(58) Field of Classification Search .................. 235/475, 235/379, 449, 454; 382/137
See application file for complete search history.

(56) References Cited

U.S. PATENT DOCUMENTS

| 6,832,723 | B2 | 12/2004 | Murata et al. |
| 6,983,885 | B2 | 1/2006 | Endo et al. |
| 2004/0257626 | A1* | 12/2004 | Panini et al. ................ 358/474 |
| 2005/0053271 | A1* | 3/2005 | Duncan ........................ 382/137 |
| 2005/0081235 | A1* | 4/2005 | Raguin et al. ................ 720/741 |

FOREIGN PATENT DOCUMENTS

| JP | 2003-87496 | 3/2003 |
| JP | 2004-206362 | 7/2004 |

* cited by examiner

*Primary Examiner*—Thien M. Le
*Assistant Examiner*—Christopher Stanford
(74) *Attorney, Agent, or Firm*—Nutter McClennen & Fish LLP; John J. Penny, Jr.

(57) ABSTRACT

A check processing device prevents or suppresses entry of ambient light to a transportation path rendered as a vertical slot between the base unit and opening and closing cover. The upstream-side transportation path part 6a of a check processing device 1 is a vertical channel defined by a base unit guide surface 21 and the cover-side guide surface 30 of an operable cover 3. The image scanning surfaces 51a and 52a of a front contact image sensor 51 and back contact image sensor 52 for imaging the front and back sides of a check 5 are exposed at the cover-side guide surface 30 and the base unit guide surface 21. A cover-side visor 62 and a base-side visor 61 are formed to the cover-side guide surface 30 and base unit guide surface 21 directly above the image scanning surfaces 51a and 52a. These visors 61 and 62 prevent or suppress ambient light from entering to the image scanning surfaces 51a and 52a even if the width of the upstream-side transportation path part 6a increases.

5 Claims, 5 Drawing Sheets

MEDIA PROCESSING DEVICE

BACKGROUND OF THE INVENTION

1. Technical Field

The present invention relates to a media processing device in which at least a part of the sheet media transportation path is defined by a vertical channel that is open at the top and is formed between the base unit of the media processing device and operable covers that open and close to the base unit.

2. Related Art

Check processing devices for processing checks are one type of media processing device used to process sheet media. See, for example, United States Patent Application 2004/0257626 and Japanese Unexamined Patent Appl. Pub. JP-A-2004-206362. Such check processing devices, also called check readers or check scanners, have an image scanner and magnetic head disposed along the media transportation path for imaging and reading magnetic ink characters from the sheet media (generally referred to as "checks" herein) conveyed through the transportation path. The checks are then sorted based on the captured information.

If a check becomes jammed in the transportation path, the check must be removed from the transportation path. So that this can be done easily, an operable cover that opens and closes is attached to the base unit, and a vertical slot that is open at the top is formed between the base unit and the cover is preferably used as the transportation path. If a check becomes jammed in the transportation path, the transportation path can be opened by simply opening the operable cover. Considering the need for maintenance of the image scanner and other internal parts, being able to open the part of the transportation path where the image scanner, magnetic head, and other parts are disposed by simply opening the operable cover is particularly convenient.

When the transportation path is formed between the base unit and operable covers, however, variation in the closed position of the cover tends to result from differences in the assembly precision of the cover and variation in the parts of the locking mechanism that locks the cover in the closed position. Variation in the closed position of the cover causes the width of the transportation path to also vary. If the width of the transportation path increases, ambient light can easily enter the transportation path from the top opening of the vertical slot rendering the transportation path.

If an image scanner or other optical part is disposed to the part of the transportation path that is defined by an operable cover that opens and closes, ambient light can degrade the quality of scanned images, increase reading error, and prevent checks from being correctly read or imaged.

SUMMARY

A media processing device according to the present invention prevents or suppresses the entry of ambient light into the transportation path even if the width of the transportation path rendered as a vertical slot between the base unit and opening and closing cover increases.

A media processing device according to a first aspect of the invention has a base unit, an operable cover that is openably and closeably attached to the base unit, a cover-side guide surface on the operable cover facing the base unit, a base-side guide surface on the base unit facing the cover-side guide surface, a transportation path for conveying sheet media, the transportation path being a vertical slot having a prescribed width, sides defined by the cover-side guide surface and the base-side guide surface, and an open top, at least one of a base-side image scanner and a cover-side image scanner, and at least one of a base-side visor and a cover-side visor. The base-side image scanner has the image scanning surface thereof exposed to the base-side guide surface, and the cover-side image scanner has the image scanning surface thereof exposed to the cover-side guide surface. The base-side visor is formed by causing the part of the base-side guide surface at the opening to the image scanner to project towards the cover-side guide surface, and the cover-side visor is formed by causing the part of the cover-side guide surface at the opening to the image scanner to project towards the base-side guide surface.

If the image scanning surface of the base-side image scanner and the image scanning surface of the cover-side image scanner are adjacent to each other along the transportation path, the base-side visor and the cover-side visor are also disposed adjacently along the transportation path corresponding to the image scanning surfaces. In this case the distal face of the base-side visor and the distal face of the cover-side visor are positioned alternately along the transportation path.

Further alternatively, a plurality of base-side visors are formed on the base-side guide surface and a plurality of cover-side visors are formed on the cover-side guide surface.

Further preferably, the distal face of the base-side visor is formed in a position retracted substantially perpendicularly to the direction of sheet media transportation from the distal part of the cover-side visor, and the distal face of the cover-side visor is formed in a position retracted substantially perpendicularly to the direction of sheet media transportation from the distal part of the base-side visor, and sheet media can travel in a straight line between these distal faces.

The media processing device according to the invention uses a vertical channel that is open at the top and is rendered between the base-side guide surface on the base unit and the cover-side guide surface of an operable cover as the sheet media transportation path. In addition, the image scanning surfaces of the base-side image scanner and the cover-side image scanning means for imaging the front and back sides of conveyed sheet media are exposed to the transportation path.

If the closed position of the operable cover varies so that the vertical channel between the cover-side guide surface and the base-side guide surface widens, the image scanning surfaces could be exposed to ambient light entering from the top opening to this vertical channel. However, by rendering a cover-side visor and a base-side visor directly above the image scanning surfaces, the visors effectively prevent or substantially eliminate ambient light from passing to the image scanning surfaces even if the width of this vertical channel increases slightly.

When the base-side image scanner and the cover-side image scanner are adjacently disposed along the transportation path, the base-side visor and the cover-side visor project from the opening to the transportation path at alternating positions along the transportation path. As a result, entry of ambient light to the image scanning surface of the base-side image scanner is prevented by the base-side visor formed directly thereabove and by the cover-side visor positioned diagonally thereabove. In addition, entry of ambient light to the image scanning surface of the cover-side image scanner is prevented by the cover-side visor formed directly thereabove and by the base-side visor positioned diagonally thereabove. Entry of ambient light to the image scanning surfaces of the base-side image scanner and the cover-side image scanner can thus be effectively prevented by both visors.

Entry of ambient light to a transportation path rendered as a vertical slot between the base unit and opening and closing cover is prevented in a media processing device according to the invention by a base-side visor and a cover-side visor. As a result, trouble such as reading errors caused by ambient light at the image scanner disposed to the transportation path can be avoided even if the position of the opening and closing cover varies when the cover is closed.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

General Configuration

Figure 1:
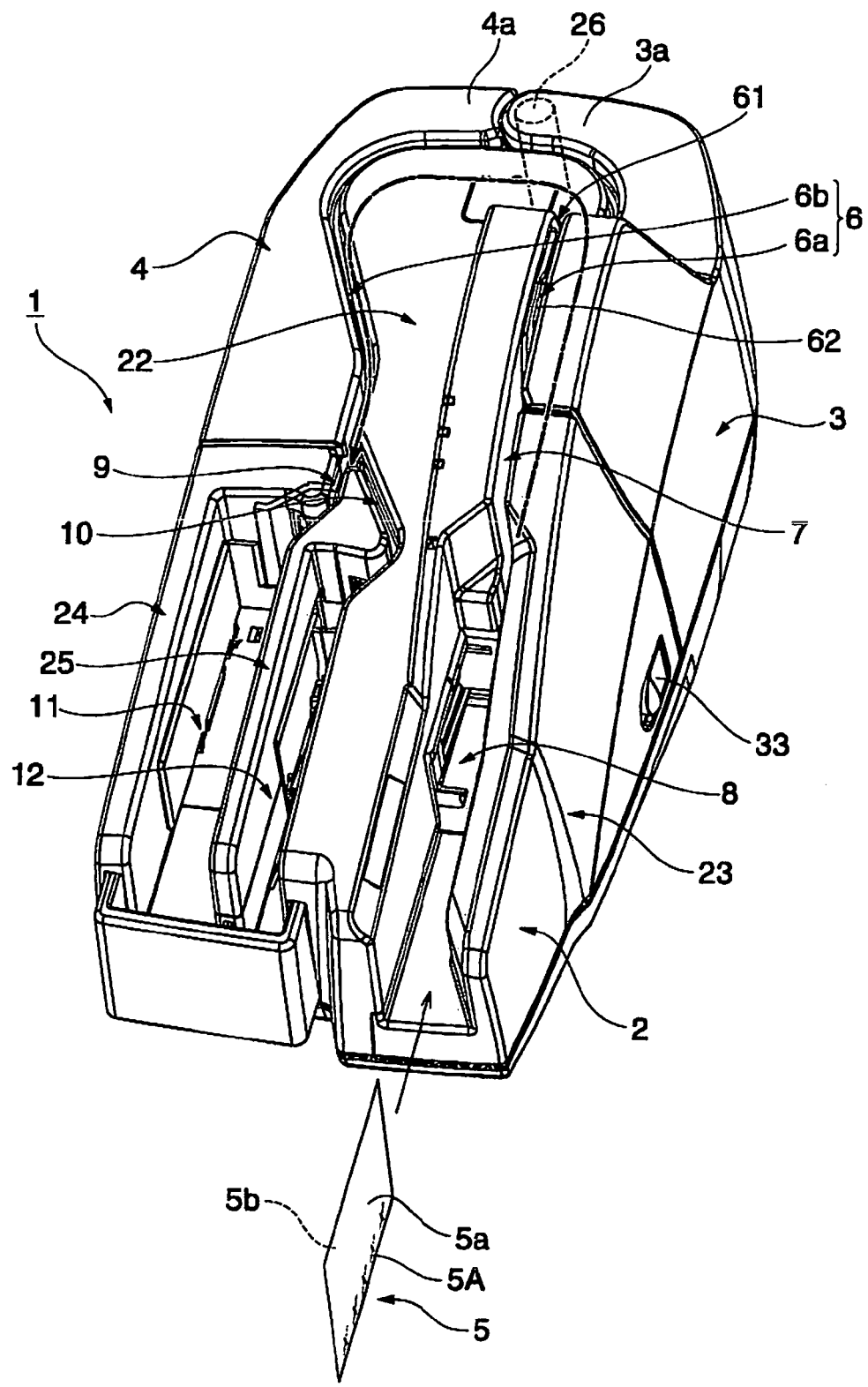
FIG. 1 is an oblique view of a check processing device according to the present invention.

FIG. 1 is an oblique view of a check processing device according to the present invention. The check processing device 1 has a main case 2 disposed to the base unit, and right and left operable covers 3 and 4. A check transportation path 6 rendered between the main case 2 and the operable covers 3 and 4 for conveying a check 5.

The check transportation path 6 is a narrow vertical slot that curves in a basically U-shaped configuration when seen from above. The end of the check transportation path 6 on the upstream side of the check transportation direction is connected through a check in-feed path 7, which is a narrow vertical slot, with a check supply unit 8, which is a wide vertical slot. The downstream end of the check transportation path 6 is connected through left and right diversion paths 9 and 10 to left and right first and second check discharge units 11 and 12. The diversion paths 9 and 10 are narrow vertical slots branching to the left and right from the check transportation path 6. The first and second check discharge units 11 and 12 are relatively wide vertical slots.

The check 5 has an MICR line 5A printed along the long bottom edge on the front 5a of the check 5. Also recorded on the front 5a against a patterned background are the check amount, payer and payee, various numbers, and the payer signature. An endorsement is recorded on the back 5b of the check 5. The checks 5 are loaded in the check supply unit 8 with the tops and bottoms of the checks aligned and the fronts 5a of the checks facing the outside of the U-shaped check transportation path 6.

When a check 5 is delivered from the check supply unit 8 through the check in-feed path 7 and then conveyed along the check transportation path 6, the MICR line 5A printed on the front 5a is read and the front 5a and back 5b of the check 5 are imaged. If this information is scanned correctly, PROCESSED or other text is printed on the front or back, and the check 5 is then diverted and discharged into the first check discharge unit 11. If the check 5 cannot be read or a scanning error occurs, nothing is printed and the check 5 is diverted and discharged into the second check discharge unit 12.

Figure 2:
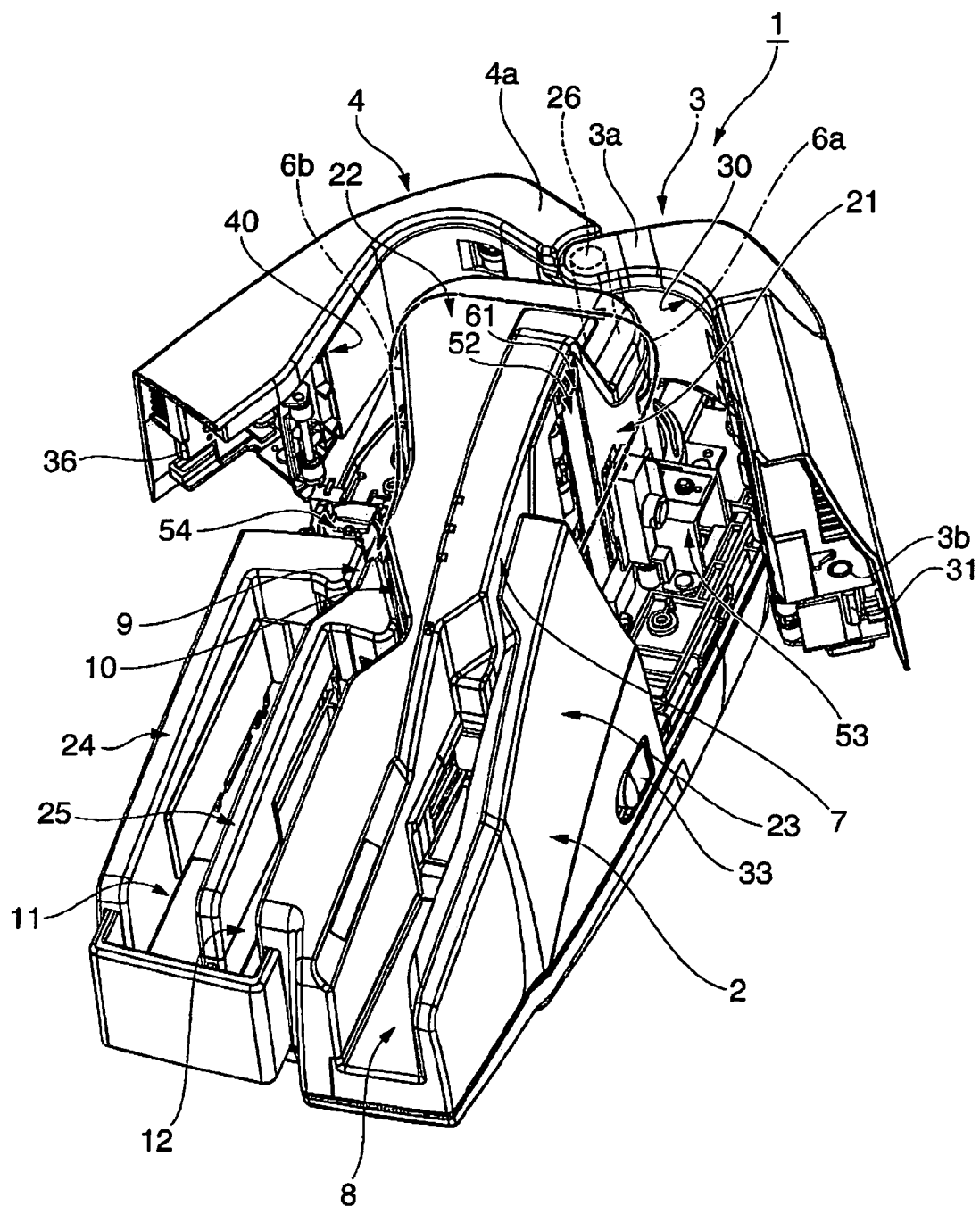
FIG. 2 is an oblique view of the check processing device with the operable covers open.
Figure 3:
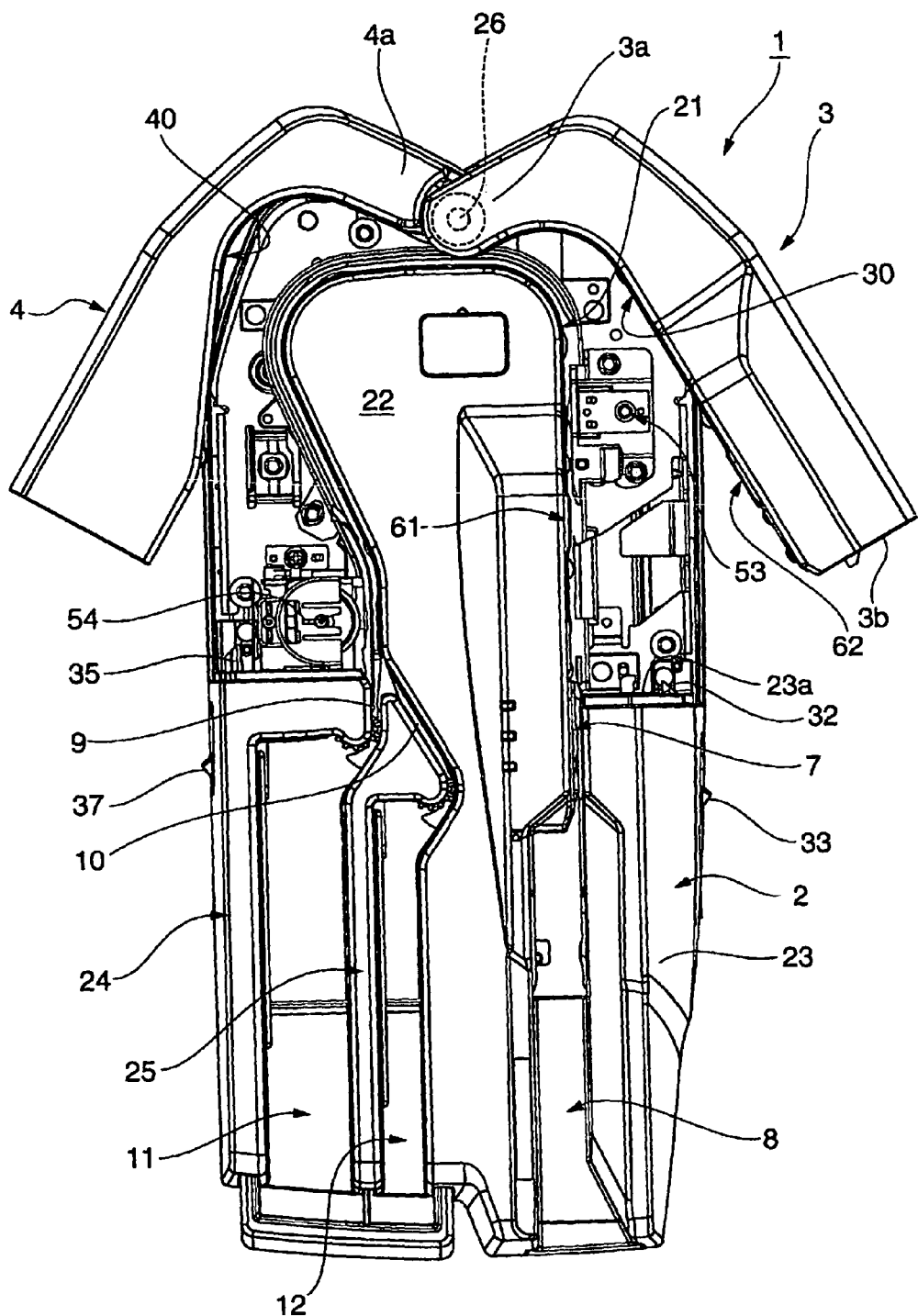
FIG. 3 is a plan view of the check processing device with the operable covers open.

FIG. 2 is an external oblique view of the check processing device 1 with the operable covers 3 and 4 open and the check transportation path 6 open, and FIG. 3 is a plan view of the same.

As shown in these figures, the case 2 has a middle case portion 22, right and left side case portions 23 and 24, and a divider 25 disposed between the middle case portion 22 and the side case portion 24. The middle case portion 22 has a vertical outside wall portion 21 that is shaped to follow the U-shaped check transportation path 6. The check supply unit 8 is rendered between the middle case portion 22 and the side case portion 23. The divider 25 divides the space between the middle case portion 22 and the side case portion 24 into left and right sides forming the first and second check discharge units 11 and 12.

The outside side part of the middle case portion 22 exposed from the right and left side case portions 23 and 24 is a base unit guide surface 21 for guiding the check 5, and this base unit guide surface 21 is covered by the operable covers 3 and 4 on both the left and right sides.

The one operable cover 3 is disposed on the side of side case portion 23. The cover-side guide surface 30 on the inside of the operable cover 3 faces the base unit guide surface 21 with a prescribed gap therebetween. The vertical slot that is open at the top and is defined by the base unit guide surface 21 and the cover-side guide surface 30 renders the upstream-side transportation path part 6a.

The other operable cover 4 is similarly disposed on the side of side case portion 24. The cover-side guide surface 40 on the inside of the operable cover 4 faces the base unit guide surface 21 with a prescribed gap therebetween. The vertical slot that is open at the top and is defined by the base unit guide surface 21 and the cover-side guide surface 40 renders the downstream-side transportation path part 6b.

The proximal end portion 3a of the upstream-side cover 3 and the proximal end portion 4a of the downstream-side cover 4 are attached to a vertical pivot pin 26 that is disposed to the case 2 so that the operable covers 3 and 4 can pivot open and closed on the pin 26.

The operable covers 3 and 4 are locked in the closed position by separate latching mechanisms. As shown in FIG. 2 and FIG. 3, the latch mechanism of the upstream-side cover 3 includes a cover-side strike 31 and a catch 32. The cover-side strike 31 is formed at the distal end 3b of the upstream-side cover 3. The catch 32 is disposed retractably into the end face 23a of the side case portion 23. The catch 32 is urged in the direction protruding from the end face 23a by the spring force of a spring member not shown that is disposed in the base unit. A sliding release button 33 for releasing the latch is disposed to the outside of the side case portion 23.

The latch mechanism of the other operable cover 4 is similarly arranged with a cover-side strike 36 and a catch 35 and sliding release button 37 disposed to the base unit.

Figure 4A:
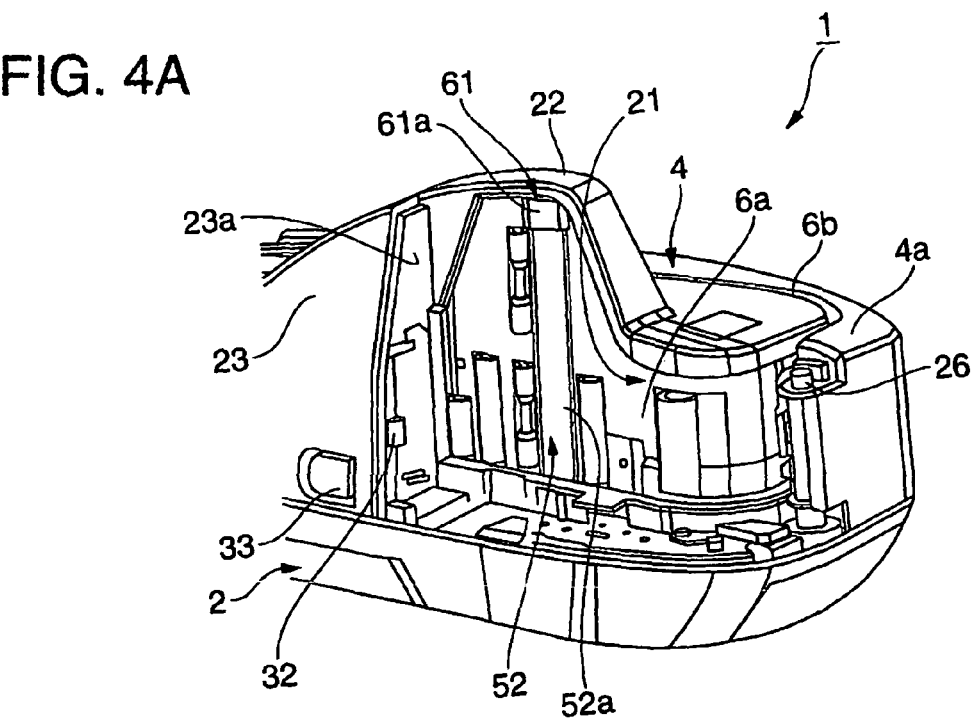
FIG. 4 is an oblique view of the check processing device with one of the operable covers removed, and an oblique view of the removed operable cover.
Figure 4B:
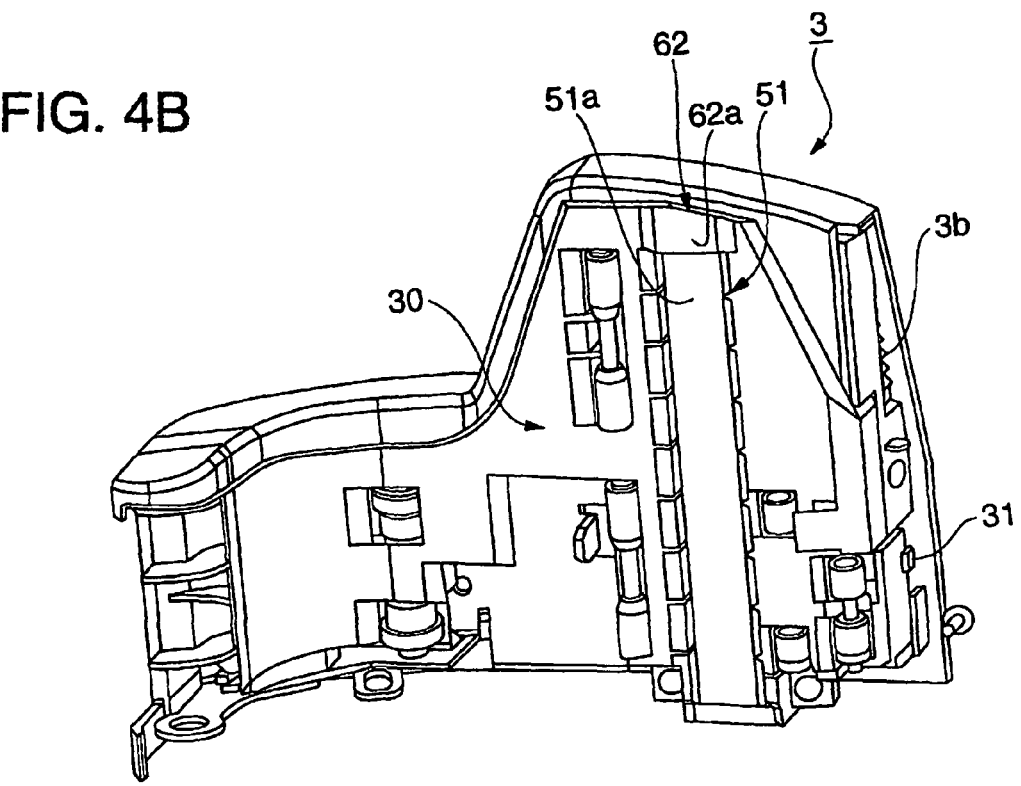

FIG. 4A is a schematic oblique view of the check processing device 1 with the operable cover 3 removed, and FIG. 4B is an oblique view showing the inside face of the removed operable cover 3.

Referring to FIG. 2, FIG. 3, and FIG. 4, a front contact image sensor 51, a back contact image sensor 52, and a magnetic head 53 (the magnetic head 53 is not shown in FIG. 4A) are disposed in order from the upstream side to the upstream-side transportation path part 6a defined by the operable cover 3. The front contact image sensor 51 images the front of the conveyed sheet medium, and the back contact image sensor 52 images the back of the conveyed sheet medium.

A print mechanism 54 for printing PROCESSED, for example, on the front 5a of a check 5 is disposed to the downstream-side transportation path part 6b that is defined by the operable cover 4. In this aspect of the invention the back contact image sensor 52, the magnetic head 53, and the print mechanism 54 are disposed to the base unit, and the front contact image sensor 51 is disposed to the operable cover 3.

The image scanning surface 52a of the back contact image sensor 52 (base-side image scanner) disposed on the base unit is exposed to the base unit guide surface 21. A base-side visor 61 is rendered at the top edge part of the base unit guide surface 21 directly above the image scanning surface 52a. The base-side visor 61 is a flat trapezoid projecting toward the cover-side guide surface 30. The base-side visor 61 is rendered over a wider area than the width of the image scanning surface 52a in the transportation direction.

The image scanning surface 51a of the front contact image sensor 51 (cover-side image scanner) disposed to the operable cover 3 is likewise exposed to the cover-side guide surface 30. This image scanning surface 51a is located on the upstream side adjacent to the image scanning surface 52a of the back contact image sensor 52. A cover-side visor 62 is rendered at the top edge part of the cover-side guide surface 30 directly above the image scanning surface 51a. The cover-side visor 62 is a flat trapezoid projecting toward the base unit guide surface 21. The cover-side visor 62 is also rendered over a wider area than the width of the image scanning surface 51a in the transportation direction.

Figure 5:
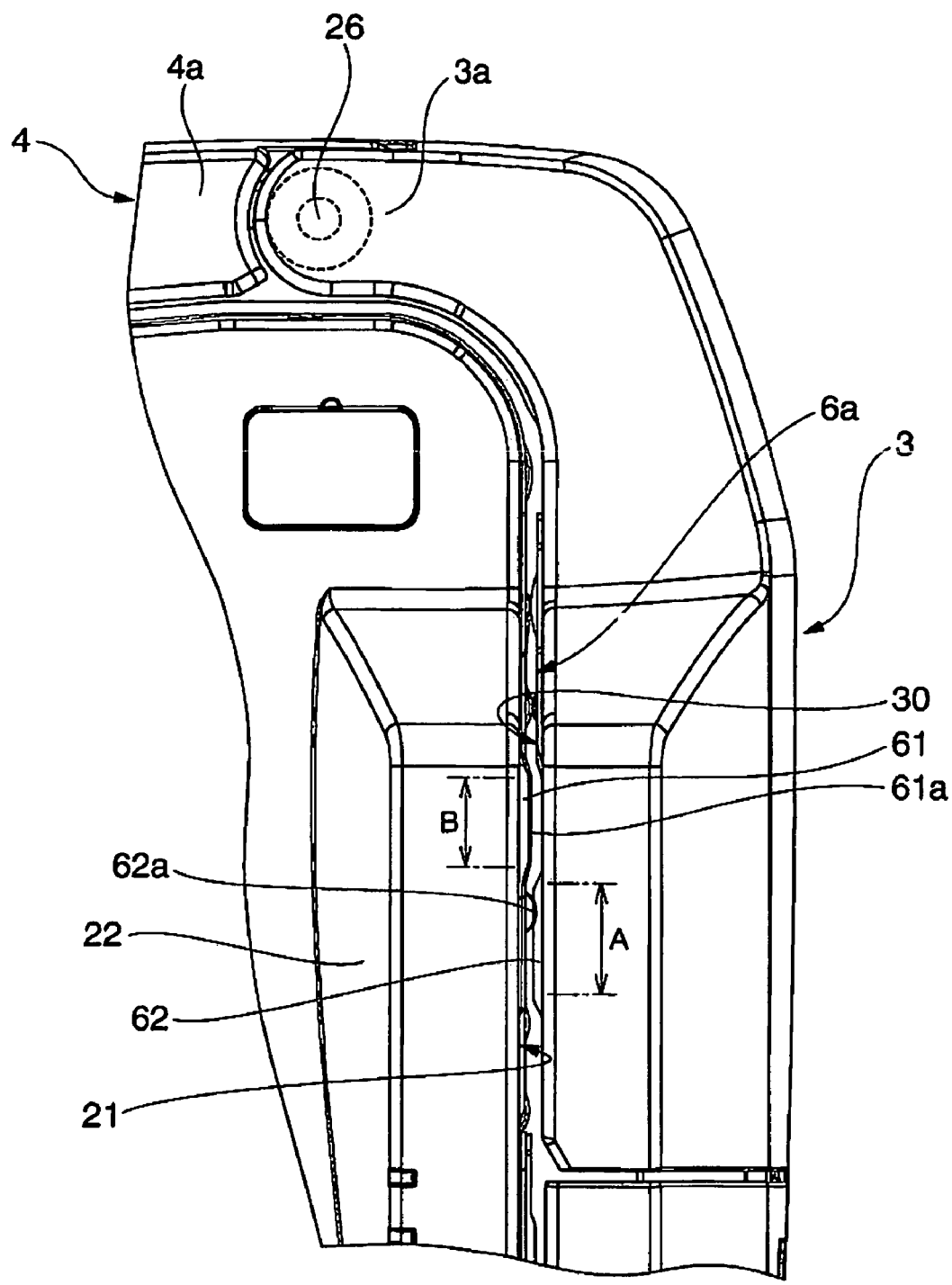
FIG. 5 is an enlarged view of a part of the upstream side transportation path.

FIG. 5 is an enlarged plan view of the upstream-side transportation path part 6a where the base-side visor 61 and cover-side visor 62 are formed. As shown in FIG. 5 the cover-side visor 62 and base-side visor 61 are mutually offset in the transportation direction. Both the base-side visor 61 and the cover-side visor 62 project substantially the same amount. A check 5 can also pass without bending between the front faces 62a and 61a of the visors 62 and 61 in a straight line. More specifically, the projection of the cover-side visor 62 and the base-side visor 61 is set to form a gap between the front faces 62a and 61a. Note that the widths of the image scanning surfaces 51a and 52a are denoted by arrows A and B in the figures.

In the check processing device 1 according to this embodiment of the invention the vertical channel that is open at the top and is rendered between the base unit guide surface 21 and the cover-side guide surface 30 of the operable cover 3 is used as the upstream-side transportation path part 6a of the checks 5. The image scanning surfaces 51a and 52a of the front contact image sensor 51 and the back contact image sensor 52 for capturing images of the front and back of the checks 5 are exposed to the upstream-side transportation path part 6a.

If the closed position of the operable cover 3 varies so that the width of the vertical slot between the cover-side guide surface 30 and the base unit guide surface 21 increases, the image scanning surfaces 51a and 52a may be exposed to ambient light entering from the top opening of this slot. However, the cover-side visor 62 and base-side visor 61 are formed directly above the image scanning surfaces 51a and 52a. As a result, even if the width of the vertical slot (transportation path) increases slightly, the visors 61 and 62 prevent or suppress the entry of ambient light to the image scanning surfaces 51a and 52a.

The cover-side visor 62 and base-side visor 61 also project at offset positions along the transportation path directly above the image scanning surfaces 51a and 52a, which are disposed adjacent to each other along the upstream-side transportation path part 6a. As a result, entry of ambient light to the image scanning surface 52a of the back contact image sensor 52 is prevented by the base-side visor 61 formed directly thereabove and by the cover-side visor 62 positioned diagonally thereabove. In addition, entry of ambient light to the image scanning surface 51a of the front contact image sensor 51 is prevented by the cover-side visor 62 formed directly thereabove and by the base-side visor 61 positioned diagonally thereabove. The visors 61 and 62 thus effectively prevent the entry of ambient light to both the image scanning surfaces 51a and 52a.

The base-side visor and cover-side visor can also be formed at plural locations. Entry of ambient light to the image scanning surfaces 51a and 52a can be prevented both from directly above and diagonally above before and after the image scanning surfaces 51a and 52a by adding a base-side visor to the top edge part of the base unit guide surface 21 on the upstream side of the cover-side visor 62 and the top edge part of the cover-side guide surface 30 on the downstream side of the base-side visor 61.

The invention can also be used in media processing devices for processing a variety of sheet media, including checks, promissory notes, and invoices. The invention can also be used, for example, in media processing devices such as printers and scanners.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
a base unit;
a cover that is openably and closeably attached to the base unit;
a cover-side guide surface on the cover facing the base unit;
a base-side guide surface on the base unit facing the cover-side guide surface;
a transportation path for conveying sheet media, the transportation path being a slot having a prescribed width and sides defined by the cover-side guide surface and the base-side guide surface;
a base-side image scanner and a cover-side image scanner, the base-side image scanner having an image scanning surface facing the cover-side guide surface, and the cover-side image scanner having an image scanning surface facing the base-side guide surface; and
at least one base-side visor and at least one cover-side visor, the base-side visor formed by causing a part of the base-side guide surface at an opening to the base-side image scanner to project towards the cover-side guide surface, and
the cover-side visor formed by causing a part of the cover-side guide surface at the opening to the cover-side image scanner to project towards the base-side guide surface,
a distal face of the base-side visor is formed in a position retracted substantially perpendicularly to the direction of sheet media transportation from a distal part of the cover-side visor, and
a distal face of the cover-side visor is formed in a position retracted substantially perpendicularly to the direction of sheet media transportation from a distal part of the base-side visor.

2. The media processing device described in claim 1, wherein a distal face of the base-side visor and a distal face of the cover-side visor are positioned alternately along the transportation path.

3. The media processing device described in claim 1, wherein a plurality of base-side visors are formed on the base-side guide surface and a plurality of cover-side visors are formed on the cover-side guide surface.

4. The media processing device described in claim 2, wherein a plurality of the base-side visors are formed on the base-side guide surface and a plurality of cover-side visors are formed on the cover-side guide surface.

5. The media processing device described in claim 2, wherein:
- the distal face of the base-side visor is formed in a position retracted substantially perpendicularly to the direction of sheet media transportation from a distal part of the cover-side visor, and
- the distal face of the cover-side visor is formed in a position retracted substantially perpendicularly to the direction of sheet media transportation from the distal part of the base-side visor.

\* \* \* \* \*